United States Patent
Fujinuma et al.

(10) Patent No.: US 8,005,180 B2
(45) Date of Patent: Aug. 23, 2011

(54) DATA DECISION APPARATUS AND ERROR MEASUREMENT APPARATUS

(75) Inventors: Kazuhiro Fujinuma, Ebina (JP); Kazuhiro Yamane, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 532 days.

(21) Appl. No.: 12/294,404

(22) PCT Filed: Mar. 26, 2007

(86) PCT No.: PCT/JP2007/056242
§ 371 (c)(1),
(2), (4) Date: Sep. 24, 2008

(87) PCT Pub. No.: WO2007/116696
PCT Pub. Date: Oct. 18, 2007

(65) Prior Publication Data
US 2009/0252270 A1 Oct. 8, 2009

(30) Foreign Application Priority Data
Mar. 31, 2006 (JP) .................................. 2006-099909

(51) Int. Cl.
*H04L 25/00* (2006.01)
(52) U.S. Cl. ........ 375/371; 375/355; 375/224; 375/376; 327/158; 327/175; 327/161; 365/233.1; 365/189.14; 365/233.12
(58) Field of Classification Search .................. 375/371, 375/224, 355, 376; 327/158, 175, 161; 365/233.1, 365/189.14, 233.12
See application file for complete search history.

(56) References Cited

U.S. PATENT DOCUMENTS

| | | | |
|---|---|---|---|
| 6,768,361 B2 * | 7/2004 | Kwak | 327/158 |
| 6,934,215 B2 * | 8/2005 | Chung et al. | 365/233.12 |
| 6,980,480 B2 * | 12/2005 | Choi | 365/189.14 |
| 7,308,060 B1 * | 12/2007 | Wall et al. | 375/355 |
| 7,388,805 B2 * | 6/2008 | Lee et al. | 365/233.1 |
| 7,397,880 B2 * | 7/2008 | Mitsumoto | 375/371 |
| 7,474,136 B2 * | 1/2009 | Heightley | 327/175 |

(Continued)

FOREIGN PATENT DOCUMENTS

JP A 5-7135 1/1993

(Continued)

*Primary Examiner* — Eva Puente
(74) *Attorney, Agent, or Firm* — Greer, Burns & Crain, Ltd.

(57) ABSTRACT

The object of the present invention is to provide a data decision apparatus and an error measurement apparatus which can set the phase of the clock to the optimum state with respect to the data signal without continuously sweeping of the phase, and can keep the state for a long time. The data decision apparatus according to the present invention comprises a delay device (34) for delaying a data signal (Dc) outputted from a decision device (31) by one bit, a first phase detector (35) for detecting a phase difference between a data signal (Db) to be inputted to the decision device (31) and the data signal (Dc) outputted from the decision device (31), a second phase detector (36) for detecting a phase difference between the data signal (Dc) outputted from the decision device (31) and a data signal (Dd) outputted from the delay device (34), a third phase detector (37) for outputting a base voltage with respect to the output values of the first and second phase detectors (35 and 36), and a phase controller (38) for controlling a phase shift amount of a variable delay device (32) to equalize an output value (P1) of the first phase detector (35) to a center value between an output value (P2) of the second phase detector (36) and the base voltage (P3).

8 Claims, 6 Drawing Sheets

U.S. PATENT DOCUMENTS

| | | | |
|---|---|---|---|
| 7,519,138 B2 * | 4/2009 | Lee et al. | 375/355 |
| 7,549,101 B2 * | 6/2009 | Chiba | 714/744 |
| 7,898,308 B2 * | 3/2011 | Gomm et al. | 327/158 |
| 2005/0141334 A1 * | 6/2005 | Jeong | 365/233 |
| 2009/0279595 A1 * | 11/2009 | Yamane et al. | 375/224 |

FOREIGN PATENT DOCUMENTS

| | | |
|---|---|---|
| JP | A 6-77785 | 3/1994 |
| JP | A 8-88625 | 4/1996 |

* cited by examiner (a)

(b)

DATA DECISION APPARATUS AND ERROR MEASUREMENT APPARATUS

This application is a U.S. National Phase under 35 U.S.C. §371 of International Application No. PCT/JP2007/056242, filed Mar. 26, 2007.

TECHNICAL FIELD

The present invention relates to a data decision apparatus for removing a phase fluctuation from an inputted data signal by controlling a read timing of the inputted data signal with a clock, and more particularly to a data decision apparatus for automatically and appropriately setting the read timing.

BACKGROUND ART

As one typical method of performing a performance evaluation on a data signal processing equipment or a transmission line, there has so far been proposed a method including the steps of inputting a data signal having a reference pattern as a test signal to an evaluation object, and measuring a bit error rate of a data signal outputted from the evaluation object.

The aforementioned method is realized by an error measurement apparatus comprising a waveform shaping circuit for removing an amplitude fluctuation from the data signal outputted from the evaluation object. The error measurement apparatus is designed to perform a bit state reading operation on the waveform-shaped data signal with a phase corrected clock to remove a phase fluctuation. In addition, the error measurement apparatus is designed to compare each bit state of the data signal without the amplitude and phase fluctuation with each bit state of the pattern of the test signal to be inputted to the evaluation object in order to obtain the error rate.

As previously mentioned, the conventional error measurement apparatus is designed to obtain the bit error rate after removing the amplitude and phase fluctuation from the data signal by the waveform shaping operation and the bit state reading operation with the clock signal. The conventional error measurement apparatus is, for example, disclosed in the following patent documents 1 and 2.

Patent Document 1: Japanese Patent Laid-Open Publication H5-7135
Patent Document 2: Japanese Patent Laid-Open Publication H8-88625

DISCLOSURE OF INVENTION

Problem to be Solved by the Invention

Each of the patent documents 1 and 2 discloses a technology to optimize a timing to read a bit state of the data signal from a waveform-shaped data signal. The technology includes the steps of sweeping the phase of the clock with respect to the data signal, finding phase shift amounts to have a mean value of output values of a decision device peaked or to have a phase difference between input and output data of the decision device maximized, and selecting the phase shift amount in the center of the found phase shift amounts as an appropriate value.

The above mentioned conventional technology, however, encounters such a problem that the phase of the clock is needed to be continuously swept with respect to the data signal over a wide range to set the appropriate phase shift amount for the preparation of the measurement. This leads to the fact that the conventional technology requires a substantial time until the actual measurement starts. Additionally, the conventional technology encounters such a problem that the measurement is required by a temperature drift to be interrupted to perform a sweeping operation as previously mentioned. This leads to the fact that the conventional technology can not perform the stable measurement for a long time.

Moreover, the conventional technology encounters such a problem that the appropriate phase shift amount depends on a mark ratio or a quality of a waveform of the inputted data signal.

It is, therefore, an object of the present invention to provide a data decision apparatus and an error measurement apparatus which can set the phase of the clock to the optimum state with respect to the data signal without continuously sweeping of the phase as previously mentioned, and can maintain the state for a long time.

Means for Resolving the Problem

According to one aspect of the present invention, there is provided a data decision apparatus comprising: a variable delay device (32) for relatively shifting phases of a waveform-shaped data signal and a clock; and a decision device (31) for reading a bit state of the data signal from the waveform-shaped data signal at one of level transition timings of the clock to output as a decided data signal while receiving the waveform-shaped data signal and the clock relatively phase shifted by the variable delay device, and in which the data decision apparatus further comprises: a delay device (34) for delaying in units of bits the decided data signal outputted from the decision device; a first phase detector (35) for outputting a voltage corresponding to a phase difference between the waveform-shaped data signal and the decided data signal outputted from the decision device; a second phase detector (36) for outputting a voltage corresponding to a phase difference between the decided data signal outputted from the decision device and a data signal outputted from the delay device; a third phase detector (37) for outputting a base voltage with respect to the voltage outputted from the first phase detector; and a phase controller (38) for controlling a phase shift amount of the variable delay device to equalize the voltage outputted from the first phase detector to a center voltage between the voltage outputted from the second phase detector and the base voltage.

The first to third phase detectors may be respectively constituted by identically constructed phase detectors, and the third phase detector may be designed to output the base voltage corresponding to a phase difference between digital data signals having identical bit state, and identical phase.

The phase controller may be operative to compare the center voltage with the output voltage of the first phase detector to control the phase shift amount of the variable delay device to decrease a phase difference between the waveform-shaped data signal and the clock when the output voltage is higher than the center voltage, and to control the phase shift amount of the variable delay device to increase the phase difference between the waveform-shaped data signal and the clock when the output voltage is lower than the center voltage.

The phase controller may be operative to receive a mark ratio of an inputted data signal to correct the center voltage in accordance with the mark ratio.

The phase controller may be operative to vary the phase shift amount of the variable delay device by an amount equal to a half cycle of the clock in case that the difference between the output voltage of the second phase detector and the base voltage is lower than a predetermined threshold.

According to other aspect of the present invention, there is provided an error measurement apparatus for measuring a bit error of an inputted data signal, comprising: a waveform shaping circuit (21) for shaping a waveform of the inputted data signal to output a waveform-shaped data signal (Db); and a data decision apparatus for deciding a bit state of the data signal from the waveform-shaped data signal, and in which the data decision apparatus is constituted as above mentioned.

The phase controller may be operative to compare the center voltage with the output voltage of the first phase detector to control the phase shift amount of the variable delay device to decrease the phase difference between the waveform-shaped data signal and the clock when the output voltage is higher than the center voltage, and to control the phase shift amount of the variable delay device to increase the phase difference between the waveform-shaped data signal and the clock when the output voltage is lower than the center voltage.

The error measurement apparatus may comprise a reference signal generator (41) for outputting a mark ratio of a specified reference signal as that of the waveform-shaped data signal, and in which the phase controller is operative to receive the mark ratio outputted from the reference signal generator to correct the center voltage in accordance with the mark ratio.

Effects of the Invention

As mentioned above, the data decision apparatus and the error measurement apparatus according to the present invention are designed to detect the phase difference of the input and output data of the decision device with the first phase detector, and designed to detect the phase difference between the data signal outputted from the decision device and the signal delayed in units of bits with the second phase detector. In addition, the data decision apparatus and the error measurement apparatus are designed to control the phase shift amount of the variable delay device to make the output value of the first phase detector equal to the center value between the output value of the second phase detector and the base voltage. The data decision apparatus and the error measurement apparatus can, therefore, set the phase of the clock to the optimum state with respect to the data signal without sweeping of the phase, and can maintain the state for a long time.

Moreover, the data decision apparatus and the error measurement apparatus according to the present invention are designed to correct the center value in accordance with the mark ratio of the data signal. The data decision apparatus and the error measurement apparatus can, therefore, perform a high-accuracy data decision operation with the sufficient phase margin with no influence of the pattern of the data signal.

Figure 1:
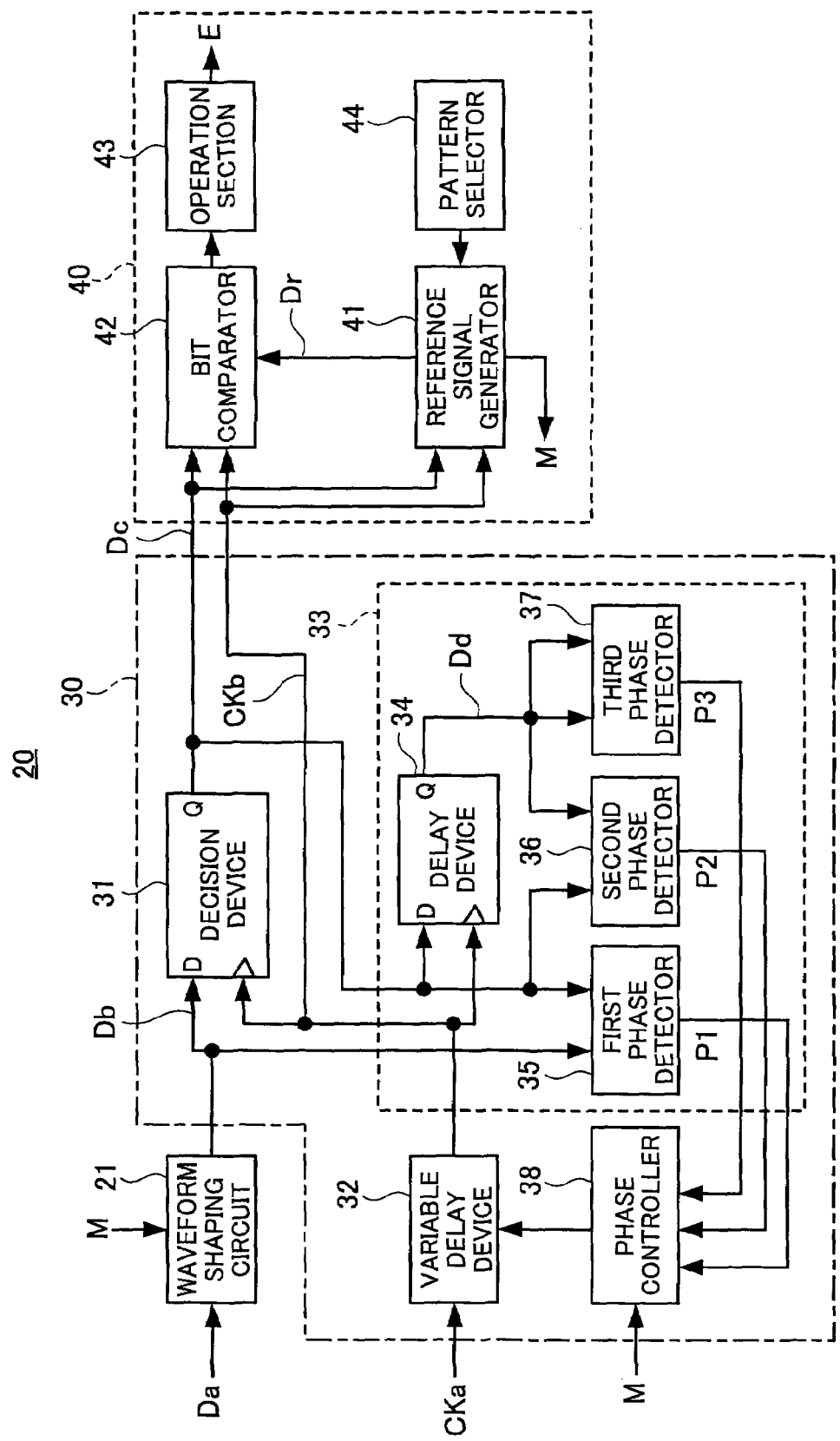
FIG. 1 is a block diagram showing a construction of the preferred embodiment according to the present invention.

EXPLANATION OF REFERENCE NUMERALS 20 error measurement apparatus
21 waveform shaping circuit
22 voltage detector
23 reference voltage generator
24 bias voltage generator
25 comparator
27 correction information outputting section
28 correction section
29 level shifter
30 data decision apparatus
31 decision device
32 variable delay device
33 phase detector
34 delay device
35 first phase detector
36 second phase detector
37 third phase detector
38 phase controller
40 error measurement section
41 reference signal generator
42 bit comparator
43 operation section

DESCRIPTION OF THE PREFERRED EMBODIMENTS

The preferred embodiments of the present invention will be described hereinafter with reference to the drawings.

FIG. 1 shows a construction of an error measurement apparatus 20 having a data decision apparatus 30 according to the present invention.

The error measurement apparatus 20 comprises a waveform shaping circuit 21 having an inputted data signal Da inputted thereto as a measuring object.

The waveform shaping circuit 21 is designed to output a waveform-shaped data signal having predetermined high and low level voltages by comparing the inputted data signal Da with a reference voltage corresponding to a center amplitude voltage of the inputted data signal Da.

Figure 2:
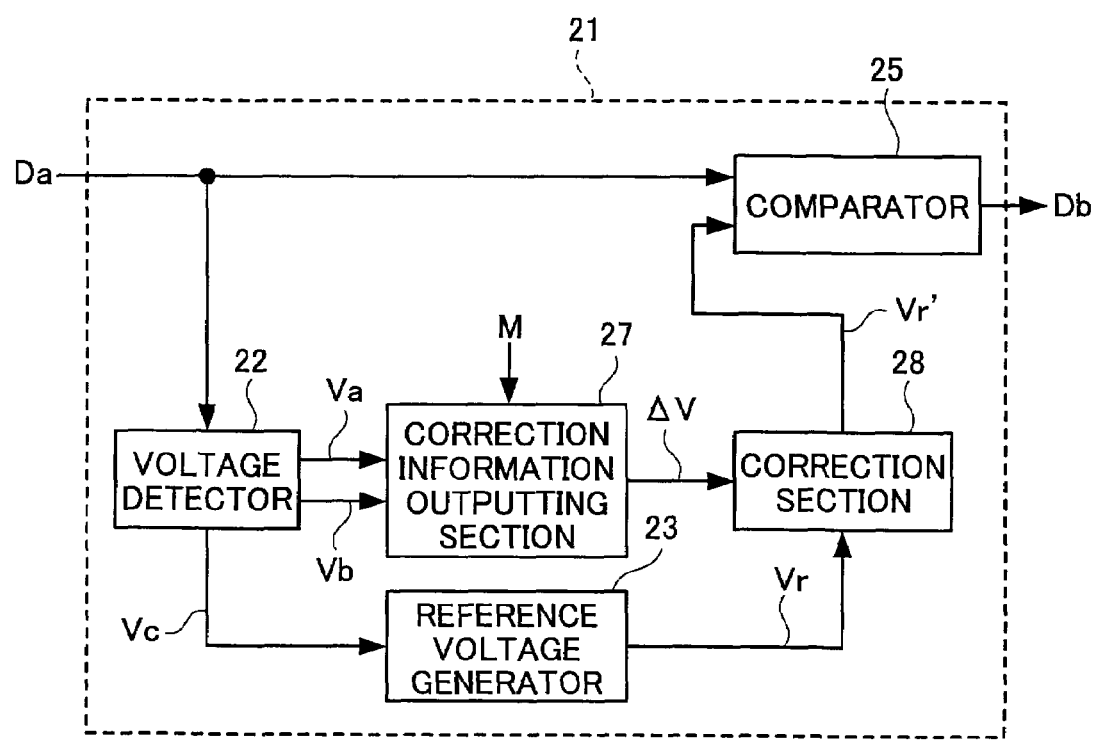
FIG. 2 is a block diagram showing an example of a constitution of a principal section of the preferred embodiment.

FIG. 2 shows an example of a specific constitution of the waveform shaping circuit 21. The waveform shaping circuit 21 comprises a voltage detector 22, a reference voltage generator 23, a comparator 25, a correction information outputting section 27, and a correction section 28.

The voltage detector 22 is designed to detect the inputted data signal Da to obtain an amplitude value and the center amplitude voltage of the inputted data signal Da.

Figure 3:
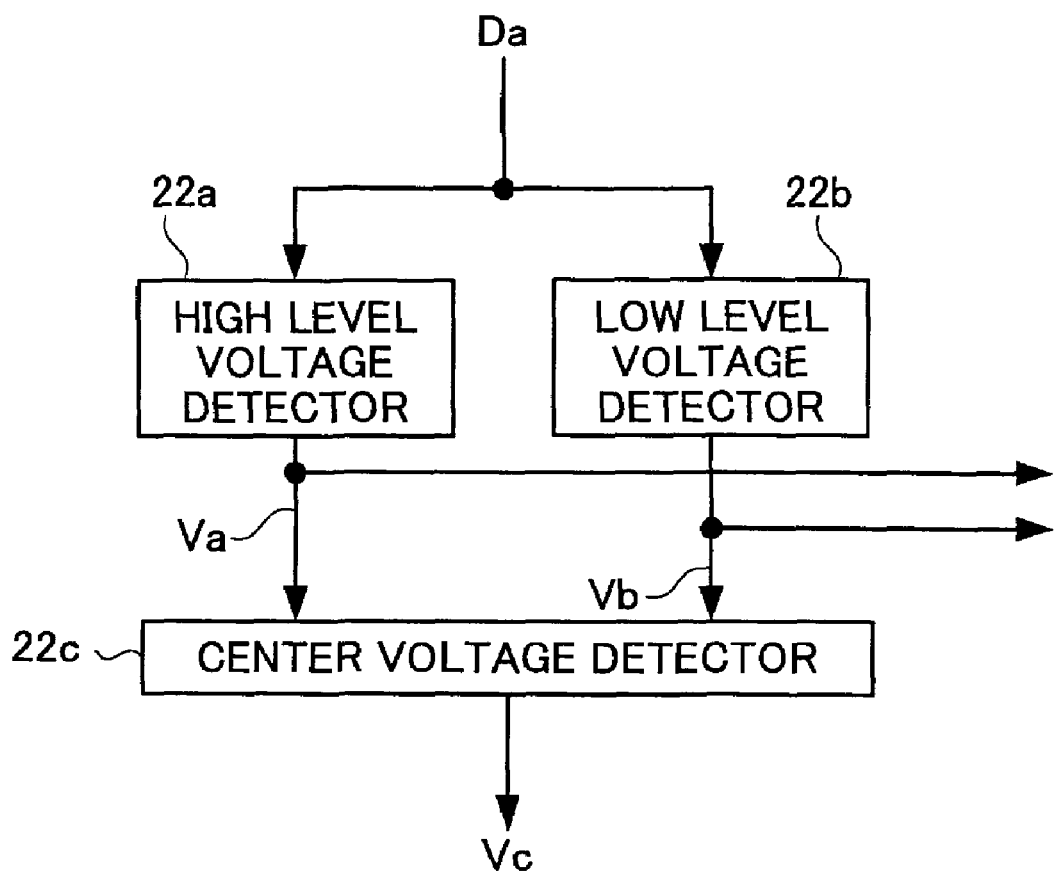
FIG. 3 is a block diagram showing an example of a constitution of other principal section of the preferred embodiment.

More specifically, as shown in FIG. 3, the voltage detector 22 has a high level voltage detector 22a for performing diode detection to detect a high level voltage Va of the inputted data signal Da, a low level voltage detector 22b for performing diode detection to detect a low level voltage Vb of the inputted data signal Da, and a center voltage detector 22c for calculating the center amplitude voltage $Vc=(Va+Vb)/2$.

The reference voltage generator 23 is designed to generate the reference voltage Vr corresponding to the center amplitude voltage Vc detected by the voltage detector 22. The reference voltage Vr is corrected by a correction section 28 which will be described hereinafter in detail.

The comparator 25 is adapted to compare the inputted data signal Da with the corrected reference voltage Vr' to produce the waveform-shaped data signal Db. The waveform-shaped data signal Db, for example, has a high level when the voltage of the inputted data signal Da is higher than the reference voltage Vr', and a low level when the voltage of the inputted data signal Da is lower than or equal to the reference voltage Vr'. The comparator 25 is adapted to output the waveform-shaped data signal Db to a decision device 31 which will be described hereinafter.

The correction information outputting section 27 is designed to output correction information $\Delta V$ to the correction section 28 on the basis of a mark ratio M outputted from a reference signal generator 41 and the amplitude of the inputted data signal. The reference signal generator 41 will become apparent as the following description. The correction information $\Delta V$ is used to correct an error in the center amplitude voltage Vc detected by the voltage detector 22.

The correction section 28 is designed to correct the reference voltage Vr on the basis of the correction information $\Delta V$. In this embodiment, the correction section 28 is designed to perform subtraction or addition correction to correct the reference voltage Vr. While there has been described about the fact that the comparator 25 is adapted to correct the reference voltage with respect to the directly inputted data signal, the waveform shaping circuit 21 may further comprise a level shifter for shifting a direct-current offset of the inputted data signal to be inputted to the comparator 25 under the state that the reference voltage is fixed according to the present invention, as described hereinafter.

The relationships between the mark ratio of the data signal and the detected output will be described hereinafter on the assumption that the mark ratio is "(the number of bits of the high level data)/(the number of all bits)". The high mark ratio causes a high mean value of a positive side (high level side) of the detected output value and a high mean value of a negative side (low level side) of the detected output values.

Figure 4:
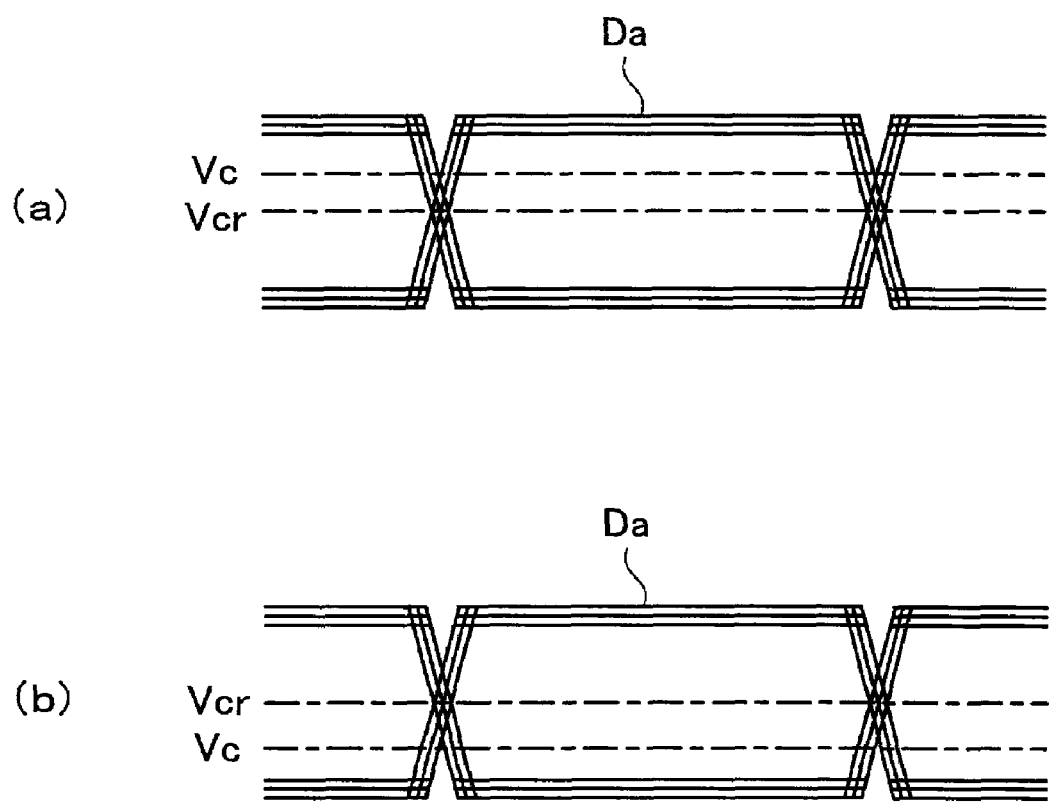
FIG. 4 is a graph to explain an operation of a principal section of the preferred embodiment.

This leads to the fact that, as shown in FIG. 4(a), the center value Vc between the positive and negative detected output values becomes higher than the real center amplitude value Vcr, viz., the amplitude margin becomes small.

In contrast, the low mark ratio causes the low mean value of the positive side (high level side) of the detected output value and a low mean value of the negative side (low level side) of the detected output values.

This leads to the fact that, as shown in FIG. 4(b), the center value Vc between the positive and negative detected output values becomes lower than the real center amplitude value Vcr, viz., the amplitude margin also becomes small.

Additionally, if the inputted data signal has a small amplitude and a low S/N ratio, the amplitude margin becomes inevitably small, viz., the amplitude margin with respect to the varied mark ratio becomes increasingly small.

For these reasons, the waveform shaping circuit 21 has a memory (not shown in the figures) for preliminarily storing therein the correction information $\Delta V$ corresponding to the mark ratio M and the amplitude. The correction information $\Delta V$, for example, indicates the error $\Delta V$ between the center value Vc of the detected output values and the real center amplitude value Vcr of the data signal. The error $\Delta V$ is preliminarily obtained from the data signals each having the different mark ratio and amplitude value. The correction information outputting section 27 is designed to read the correction information $\Delta V$ on the basis of the amplitude value detected by the voltage detector 22 and the mark ratio M from the memory. The correction section 28 is designed to add the correction information $\Delta V$ to the reference voltage Vr to output the comparator 25.

The waveform shaping circuit 21 thus constructed can perform the waveform shaping operation with the sufficient amplitude margin, even if the amplitude of the data signal is small or the mark ratio of the data signal is substantially varied.

While there has been described about the fact that the correction information outputting section 27 is designed to read the correction information preliminarily stored in the memory to use, the correction information outputting section 27 may be designed to perform an arithmetic processing operation to calculate the correction information $\Delta V$ at each time of the measurement according to the present invention. The arithmetic processing operation is determined in accordance with the form of the circuit. The error of the center value tends to be highly affected by the mark ratio and the amplitude. The correction information $\Delta V$ is, therefore, calculated in accordance with the following equation based on coefficients α and β, a deference between the mark ratio and 50%, and an amplitude (Va−Vb).

$$\Delta V = (M-0.5)[\alpha(Va-Vb)+\beta]$$

The coefficients α and β are not respectively limited to constants. The coefficients α and β may be, for example, preliminarily determined by each combination of a surrounding temperature of the waveform shaping circuit 21, a bit-rate of the inputted data signal Da (i.e., a frequency of an inputted clock CKa), and the mark ratio M of the inputted data signal Da to be stored in the abovementioned memory according to the present invention. In this case, the correction information outputting section 27 is designed to select the coefficients α and β from contents stored in the memory in accordance with the measurement conditions.

The correction information outputting section 27 is further designed to calculate the correction information $\Delta V$ by using of the above described equation on the basis of the amplitude value (Va−Vb), the coefficients α and β, and the mark ratio. The amplitude value (Va−Vb) is obtained from Va and Vb detected by the voltage detector 22. The coefficients α and β are selected by the manner previously mentioned.

It is assumed that the coefficients α and β are discretely predetermined by each combination of the surrounding temperature of the waveform shaping circuit 21, the bit-rate of the inputted data signal Da, and the mark ratio M of the inputted data signal Da. If the coefficients α and β are predetermined, for example, in 1 Gbps and 5 Gbps of the bit-rate of the inputted data signal Da, the correction information outputting section 27 can calculate the correction information $\Delta V$ in 3 Gbps of the bit-rate by use of the linear interpolation or the like at the time of the measurement. The correction information outputting section 27 can, therefore, calculate the correction information $\Delta V$ under any measurement conditions.

The correction information outputting section 27 may be designed to obtain the correction information $\Delta V$ from the memory with no use of the above described equation according to the present invention. In this case, the above mentioned combination further includes the amplitude value (Va−Vb).

As shown in FIG. 1, the data signal Db thus waveform shaped is inputted to the decision device 31 of the data decision apparatus 30. The inputted clock CKa from outside with the inputted data signal Da is delayed by the variable delay device 32. The delayed clock CKb is inputted to the decision device 31.

The decision device 31 is constituted by a flip-flop circuit to latch a bit state of the data signal Db at one of level transition timings (e.g., rise time) of the clock CKb to output the result of the latching to an error measurement section 40 as a decided data signal Dc.

The phase detector 33 is designed to produce three signals P1 to P3 required to judge whether or not a decision timing of the decision device 31, i.e., the level transition timing of the clock signal CKb, is appropriate, while receiving the data signal Db and the data signal Dc outputted from the decision device 31.

More specifically, the phase detector 33 has a delay device 34 constituted by a flip-flop circuit to delay the data signal Dc by one bit, a first phase detector 35 for detecting a phase difference between the data signals Db and Dc, a second phase detector 36 for detecting a phase difference between the data signal Dc and the data signal Dd outputted from the delay device 34, and a third phase detector 37 for detecting a phase difference between identical signals (in this example, each of the identical signal is the data signal Dd and the phase difference is constantly 0). Each of the phase detectors 35 to 37 is constituted by an EX-OR (exclusive OR) circuit and a LPF. The EX-OR circuit is adapted to judge whether or not two signals respectively having the compared phases are identical to each other. The LPF is adapted to pass direct-current of the output of the EX-OR circuit.

The third phase detector 37 constitutes base voltage outputting means for outputting a base voltage (the base voltage is at the low level in this example) with respect to the output of the first and second phase detectors 35 and 36. The base voltage outputting means is constituted by the same constructed phase detector as other two phase detectors previously mentioned. This results in the fact that the influence of a temperature drift is canceled. The base voltage outputting means may be constituted by other logic circuits for constantly outputting the base voltage in place of the phase detector according to the present invention.

In the second phase detector 36, bit error occurs in high probability, by the reason that the two data signals having the identical bit state are inputted to the second phase detector 36 under the state that the phase difference between the two signals is one bit. The output value P2 of the second phase detector 36 is, therefore, nearly equal to a maximum output voltage VH of the circuit element.

The output value P3 of the third phase detector 37 is nearly equal to a minimum output voltage VL (the base voltage) of the circuit element, by the reason that the two data signals having the identical bit state are inputted to the third phase detector 37.

The output value P1 of the first phase detector 35 is in the range between the voltages VH and VL, by the reason that the two data signals having the identical bit state are inputted to the first phase detector 35 under the state that the phase difference between the two signals is within one bit.

In case that the phase of the data signal Db is nearly equal to that of the data signal Dc, the output value P1 becomes nearly equal to the voltage VL. In case that the phase of the data signal Db is shifted nearly one bit with respect to that of the data signal Dc, the output value P1 becomes nearly equal to the voltage VH.

Figure 5:
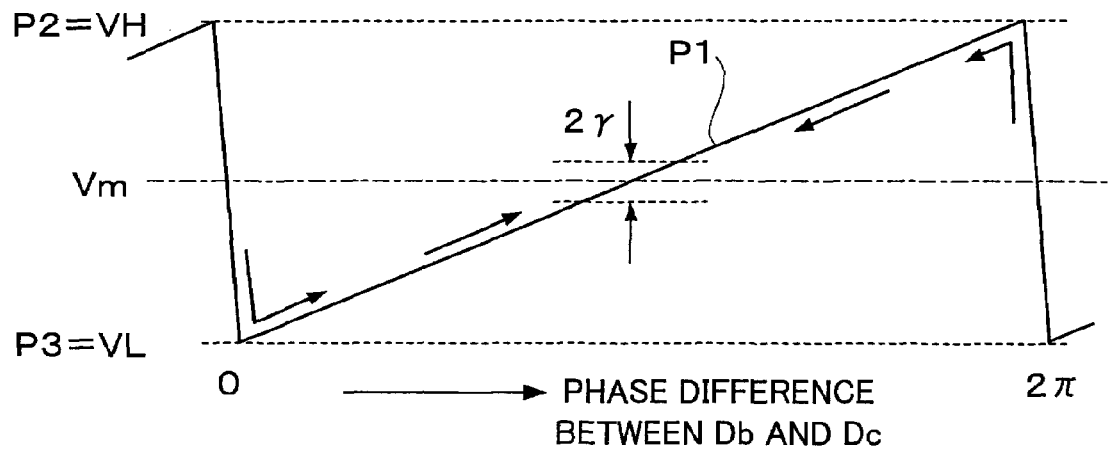
FIG. 5 is a graph to explain an operation of other principal section of the preferred embodiment.
Figure 5:
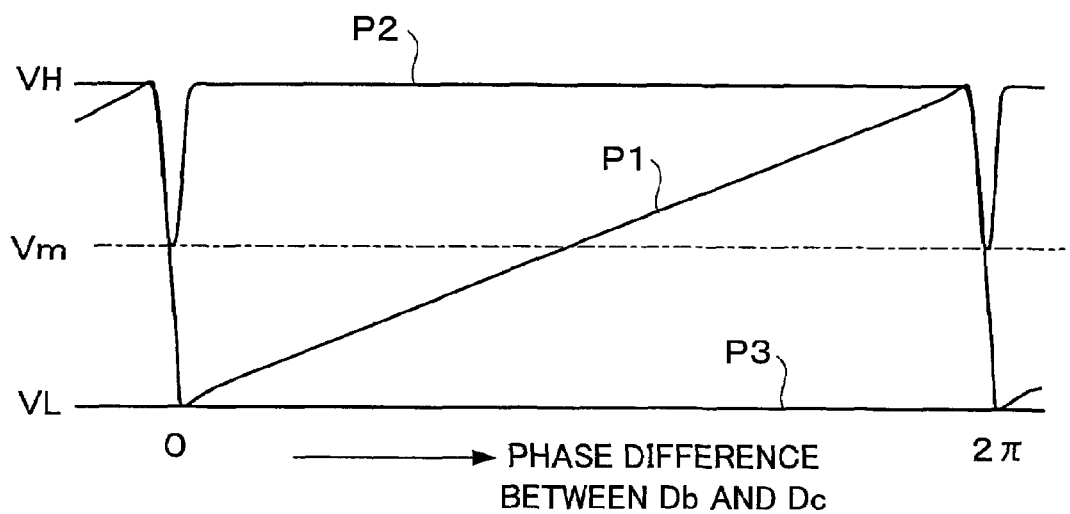

As shown in FIG. 5(a), the output value P1 of the first phase detector 35 is monotonically increasing at a constant gradient from the voltage VL to the voltage VH in response to the phase difference $\phi$ varied from 0 to $2\pi$ between the data signals Db and Dc. This leads to the fact that the phase margin is the highest under the state that the output value P1 is equal to a center value Vm between the voltages VL and VH.

The phase controller 38 is operative to calculate a center voltage between the output values P2 and P3 as the center value Vm between the voltages VL and VH, and to compare an allowable voltage range Vm±γ given to the center value Vm with the output value P1. The phase controller 38 is operative to decrease a delay amount of the clock when the output value P1 is higher than Vm+γ, and to increase the delay amount of the clock when the output value P1 is lower than Vm−γ. The phase controller 38 is, consequently, operative to bring the output value P1 into the allowable voltage range Vm±γ to keep the phase margin to be the highest (see arrows shown in FIG. 5(a)).

As shown in FIG. 5(b), the respective output values P1 to P3 of the first to third phase detectors 35 to 37 are varied in response to the phase difference $\phi$ varied from 0 to $2\pi$ between the data signals Db and Dc.

In case that the latch timing of the delay device 34 is within the level transition interval of the data signal Db, viz., in the case the phase difference between the data signals Db and Dc is nearly equal to 0 or $2\pi$, the value of the data signal Dc becomes unstable. This results in the fact that the output value P2 of the second phase detector 36 approaches to the center value Vm between the voltages VL and VH.

The phase controller 38 is, consequently, operative to vary the delay amount of the clock by half cycle ($\pi$ or $-\pi$) when the output value P2 is lower than a predetermined threshold. The phase controller 38 thus constructed can quickly bring the output value P1 into the allowable voltage range Vm±γ. The phase controller 38 may be operative to vary the delay amount of the clock by half cycle when the difference between the output values P2 and P3 is lower than a predetermined threshold according to the present invention.

The phase controller 38 is operative to perform the phase control processing operation above mentioned at all times, at regular time intervals, or at any timings specified by a user.

In any case, the phase controller 38 can set the phase margin to the most sufficient state without continuously sweeping of the phase over a wide range, and can maintain the state for a long time.

The output value P2 of the second phase detector 36 is varied in response to the varied mark ratio of the inputted data signal Da. The varied output value P2 causes an error in the center value Vm.

The phase controller 38 is, consequently, operative to calculate a correction amount X on the basis of the mark ratio outputted from a reference signal generator 41 and a constant value k, and correct the center voltage between the output values P2 and P3 on the basis of the correction amount X to obtain the corrected center value Vm by following equations. The reference signal generator 41 will be described hereinafter.

$$Vm=[(P2+P3)/2]+X$$

$$X=|M-0.5|\cdot k$$

The phase controller 38 can, by use of the corrected center value Vm, perform a high-accuracy data decision operation at the timing when the phase margin is the most sufficient.

The data signal Dc obtained by the manner above mentioned is inputted to the error measurement section 40 with the clock signal CKb.

The error measurement section 40 comprises a reference signal generator 41 for outputting a reference signal Dr to the bit comparator 42 in synchronism with the clock signal CKb. The reference signal Dr has the same bit string as that of the data signal Dc.

The bit comparator 42 is designed to make a judgment whether or not the bit of the data signal Dc is identical to that of the reference signal Dr to output the result of the judgment to the operation section 43. The operation section 43 is designed to calculate a bit error rate E by the result of the judgment of the bit comparator 42.

The bit string (i.e., pattern) used for the judgment is selectable by the user (The bit string is, generally, selected as the pattern identical to the pattern to be outputted from an evaluation object having the data signal with the reference pattern inputted thereto). The reference signal generator 41 is designed to produce the reference signal Dr having the bit string selected by a pattern selector 44.

In addition, the reference signal generator 41 has a function to output the mark ratio M of the selected pattern to the correction information outputting section 27 and the phase controller 38.

The reference signal generator 41 is designed to calculate the mark ratio M on the basis of the selected pattern. In another construction, the reference signal generator 41 may has a memory for preliminarily storing the mark ratios corresponding to the respective patterns to be referenced at the time when the pattern is selected according to the present invention.

As will be seen from the foregoing description, it is to be understood that the preferred embodiment of the data decision apparatus 30 according to the present invention is designed to detect the phase difference of the input and output data signals of the decision device 31 with the first phase detector 35, and designed to detect the phase difference between the data signal outputted from the decision device 31 and the one bit delayed data signal with the second phase detector 36. In addition, the data decision apparatus 30 is designed to control the phase shift amount of the variable delay device 32 to make the output value P1 equal to the center value Vm between the output value P2 of the second phase detector 36 and the base voltage (i.e., the output value P3 of the third phase detector 37). The data decision apparatus 30 can, therefore, set the phase of the clock to the optimum state with respect to the data signal without sweeping of the phase, and can maintain the state for a long time.

Moreover, the data decision apparatus 30 is designed to correct the center value in accordance with the mark ratio M. The data decision apparatus 30 can, therefore, perform the high-accuracy data decision operation with the sufficient phase margin with no influence of the pattern of the data signal.

Figure 6:
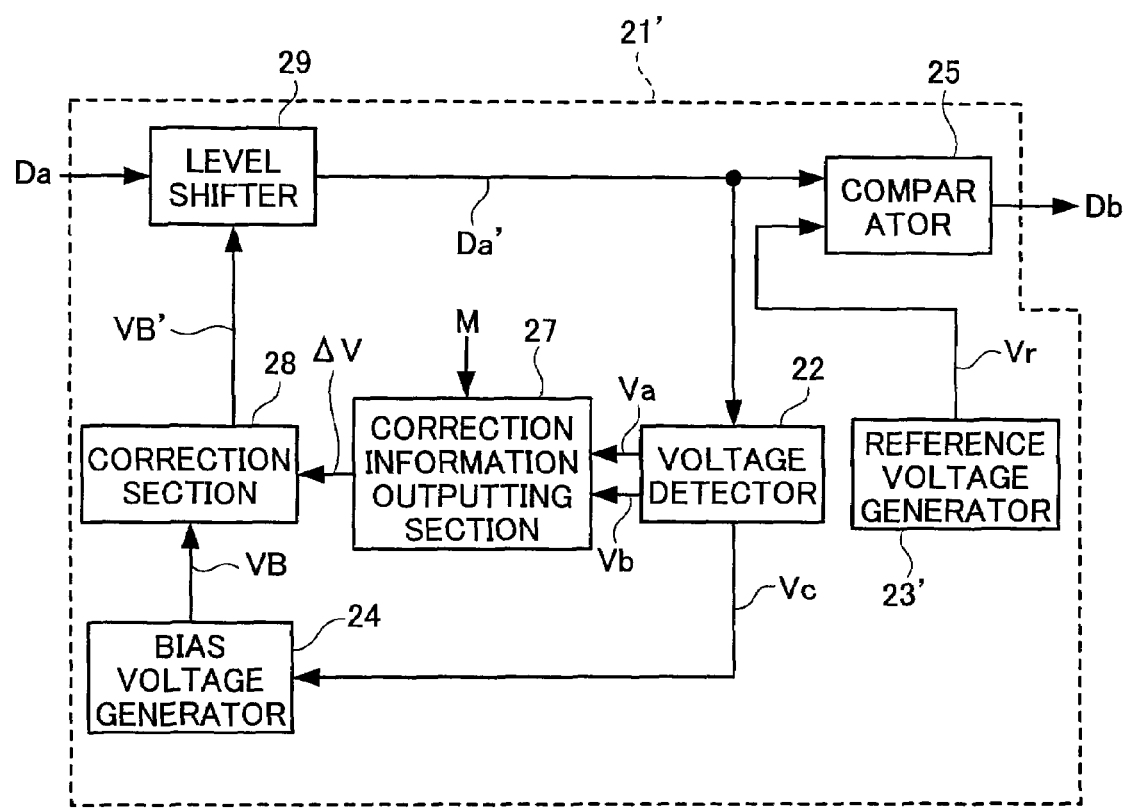
FIG. 6 is a block diagram showing another example of the constitution of the principal section of the preferred embodiment.

While there has been described about the fact that the waveform shaping circuit 21 of the data decision apparatus 30 is designed to correct the reference voltage to be inputted to the comparator 25, the data decision apparatus 30 may have a waveform shaping circuit 21', in place of the waveform shaping circuit 21, for shifting the level of the inputted data signal Da as shown in FIG. 6 according to the present invention.

The waveform shaping circuit 21' comprises a level shifter 29, a voltage detector 22, a reference voltage generator 23', a bias voltage generator 24, a comparator 25, a correction information outputting section 27, and a correction section 28.

The level shifter 29 is adapted to shift the level of the inputted data signal Da by a bias voltage VB' supplied from the correction section 28. The reference voltage generator 23' is designed to produce the reference voltage Vr.

The comparator 25 is adapted to compare the inputted data signal Da' having the level shifted by the level shifter 29 with the reference voltage Vr to produce the waveform-shaped data signal Db. The waveform-shaped data signal Db, for example, has a high level when the voltage of the inputted data signal Da' is higher than the reference voltage Vr and a low level when the voltage of the inputted data signal Da' is lower than or equal to the reference voltage Vr. The comparator 25 is adapted to output the waveform-shaped data signal Db to a decision device 30.

The voltage detector 22 is designed to detect the high and low level voltages Va and Vb and the center amplitude voltage Vc. The correction information outputting section 27 is designed to output the correction information $\Delta V$on the basis of the mark ratio M outputted from the reference signal generator 41 and the amplitude value (Va−Vb) of the inputted data signal Da' with the shifted level.

The correction information $\Delta V$ is obtained by the same manner as previously mentioned.

The bias voltage generator 24 is, for example, constituted by a low pass filter to generate the bias voltage VB on the basis of the center amplitude voltage Vc detected by the voltage detector 22. In the case that pulsating of the center amplitude voltage Vc is sufficiently small, the bias voltage generator 24 may treat the center amplitude voltage Vc as the bias voltage VB according to the present invention.

The correction section 28 is designed to provide the level shifter 29 with the bias voltage VB' by use of the reference voltage Vr, the correction information $\Delta V$, and the bias voltage VB in order to adjust the offset of the inputted data signal Da' to the reference voltage Vr.

As will be seen from the foregoing description, it is to be understood that the waveform shaping circuit 21' can perform the waveform shaping operation with the sufficient amplitude margin, even if the mark ratio of the inputted data signal is substantially varied or the amplitude of the inputted data signal is decreased.

While there has been described about the fact that the variable delay device 32 is designed to shift the phase of the clock with respect to the phase of the data signal in this embodiment, the variable delay device 32 may be designed to shift the phase of the data signal outputted from the waveform shaping circuit 21 or 21' with respect to the phase of the clock according to the present invention.

What is claimed is:

1. A data decision apparatus comprising:
    a variable delay device (32) for relatively shifting phases of a waveform-shaped data signal and a clock; and
    a decision device (31) for reading a bit state of said data signal from said waveform-shaped data signal at one of level transition timings of said clock to output as a decided data signal while receiving said waveform-shaped data signal and said clock relatively phase shifted by said variable delay device, and in which said data decision apparatus further comprises:
    a delay device (34) for delaying in units of bits said decided data signal outputted from said decision device;
    a first phase detector (35) for outputting a voltage corresponding to a phase difference between said waveform-shaped data signal and said decided data signal outputted from said decision device;
    a second phase detector (36) for outputting a voltage corresponding to a phase difference between said decided data signal outputted from said decision device and a data signal outputted from said delay device;
    a third phase detector (37) for outputting a base voltage with respect to said voltage outputted from said first phase detector; and
    a phase controller (38) for controlling a phase shift amount of said variable delay device to equalize said voltage outputted from said first phase detector to a center voltage between said voltage outputted from said second phase detector and said base voltage.

2. A data decision apparatus as set forth in claim 1, in which said first to third phase detectors are respectively constituted by identically constructed phase detectors, and
said third phase detector is designed to output said base voltage corresponding to a phase difference between digital data signals having identical bit state, and identical phase.

3. A data decision apparatus as set forth in claim 1, in which said phase controller is operative to compare said center voltage with said output voltage of said first phase detector to control said phase shift amount of said variable delay device to decrease a phase difference between said waveform-shaped data signal and said clock when said output voltage is higher than said center voltage, and to control said phase shift amount of said variable delay device to increase said phase difference between said waveform-shaped data signal and said clock when said output voltage is lower than said center voltage.

4. A data decision apparatus as set forth in claim 1, in which said phase controller is operative to receive a mark ratio of an inputted data signal to correct said center voltage in accordance with said mark ratio.

5. A data decision apparatus as set forth in claim 1, in which said phase controller is operative to vary said phase shift amount of said variable delay device by an amount equal to a half cycle of said clock in case that the difference between said output voltage of said second phase detector and said base voltage is lower than a predetermined threshold.

6. An error measurement apparatus for measuring a bit error of an inputted data signal, comprising:
   a waveform shaping circuit (21) for shaping a waveform of said inputted data signal to output a waveform-shaped data signal; and
   a data decision apparatus as set forth in any one of claims 1 to 5 for deciding a bit state of said data signal from said waveform-shaped data signal.

7. An error measurement apparatus as set forth in claim 6, in which
   said phase controller is operative to compare said center voltage with said output voltage of said first phase detector to control said phase shift amount of said variable delay device to decrease said phase difference between said waveform-shaped data signal and said clock when said output voltage is higher than said center voltage, and to control said phase shift amount of said variable delay device to increase said phase difference between said waveform-shaped data signal and said clock when said output voltage is lower than said center voltage.

8. An error measurement apparatus as set forth in claim 6, further comprising
   a reference signal generator (41) for outputting a mark ratio of a specified reference signal as that of said waveform-shaped data signal, and in which
   said phase controller is operative to receive said mark ratio outputted from said reference signal generator to correct said center voltage in accordance with said mark ratio.

\* \* \* \* \*